US012783177B2

(12) United States Patent
Deng

(10) Patent No.: US 12,783,177 B2
(45) Date of Patent: Nov. 3, 2026

(54) NON-VOLATILE MEMORY AND CONTROL METHOD THEREOF

(71) Applicant: REALTEK SEMICONDUCTOR CORPORATION, Hsinchu (TW)

(72) Inventor: Yuan-Ming Deng, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 19/210,119

(22) Filed: May 16, 2025

(65) Prior Publication Data

US 2025/0362833 A1 Nov. 27, 2025

(30) Foreign Application Priority Data

May 21, 2024 (TW) ................................ 113118814

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 7/58; G06F 7/588
See application file for complete search history.

(56) References Cited

U.S. PATENT DOCUMENTS

| | | | | |
|---|---|---|---|---|
| 6,792,528 | B1 | 9/2004 | Hou | |
| 7,554,865 | B2 | 6/2009 | Pickles | |
| 2012/0306189 | A1* | 12/2012 | Stewart | G06K 19/086 283/67 |
| 2015/0147985 | A1* | 5/2015 | Marr | G06F 1/0321 455/91 |
| 2016/0139827 | A1* | 5/2016 | Lee | G06F 3/064 711/103 |

FOREIGN PATENT DOCUMENTS

TW 200823926 A 6/2008

OTHER PUBLICATIONS

OA letter of a counterpart TW application (appl. No. 113118814) mailed on Mar. 13, 2025.

* cited by examiner

*Primary Examiner* — Gary W. Cygiel
(74) *Attorney, Agent, or Firm* — WPAT, PC

(57) ABSTRACT

A non-volatile memory device includes a non-volatile memory, a random number generator, a power supply, and a memory access controller. The non-volatile memory is configured to store at least one data. The random number generator is configured to generate a random number. The power supply is configured to generate a random power according to the random number, and provide the random power to the non-volatile memory. The memory access controller is configured to generate a random sequence according to the random number, obtain a random sequence data from the non-volatile memory according to the random sequence, and reconstruct the random sequence data according to the random sequence to generate the at least one data.

20 Claims, 6 Drawing Sheets

200

NON-VOLATILE MEMORY AND CONTROL METHOD THEREOF

BACKGROUND OF THE INVENTION

1. Field of the Invention

The present disclosure relates to a non-volatile memory device and a control method thereof, especially to a non-volatile memory device and a control method thereof that executes a data accessing process according to a random number.

2. Description of Related Art

When accessing non-volatile memory (NVM), different voltages, currents, or power consumption occur. For example, accessing a bit (such as 0 or 1) of the non-volatile memory can lead to different power consumption. This variation in power consumption can be utilized by lawbreakers to crack and obtain the data stored within the non-volatile memory.

SUMMARY OF THE INVENTION

In some aspects, an object of the present disclosure is to, but not limited to, provides a non-volatile memory device and a control method thereof that makes an improvement to the prior art.

An embodiment of the non-volatile memory device of the present disclosure includes a non-volatile memory, a random number generator, a power supply, and a memory access controller. The non-volatile memory is configured to store at least one data. The random number generator is configured to generate a random number. The power supply is configured to generate a random power according to the random number, and provide the random power to the non-volatile memory. The memory access controller is configured to generate a random sequence according to the random number, obtain a random sequence data from the non-volatile memory according to the random sequence, and reconstruct the random sequence data according to the random sequence to generate the at least one data.

An embodiment of the control method of the non-volatile memory device of the present disclosure includes: storing at least one data by a non-volatile memory; generating a random number by a random number generator; generating a random power according to the random number, and providing the random power to the non-volatile memory by a power supply; and generating a random sequence according to the random number, obtaining a random sequence data from the non-volatile memory according to the random sequence, and reconstructing the random sequence data according to the random sequence to generate the at least one data by a memory access controller.

Technical features of some embodiments of the present disclosure make an improvement to the prior art. The non-volatile memory device and the control method thereof in the present disclosure can perform a data accessing process according to a random number, thereby preventing the data stored in the non-volatile memory from being stolen by lawbreakers.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

To address the problem that data stored in a non-volatile memory can be stolen by lawbreakers, the present disclosure provides a non-volatile memory device and a control method thereof, which will be explained in detail as shown below.

Figure 1:
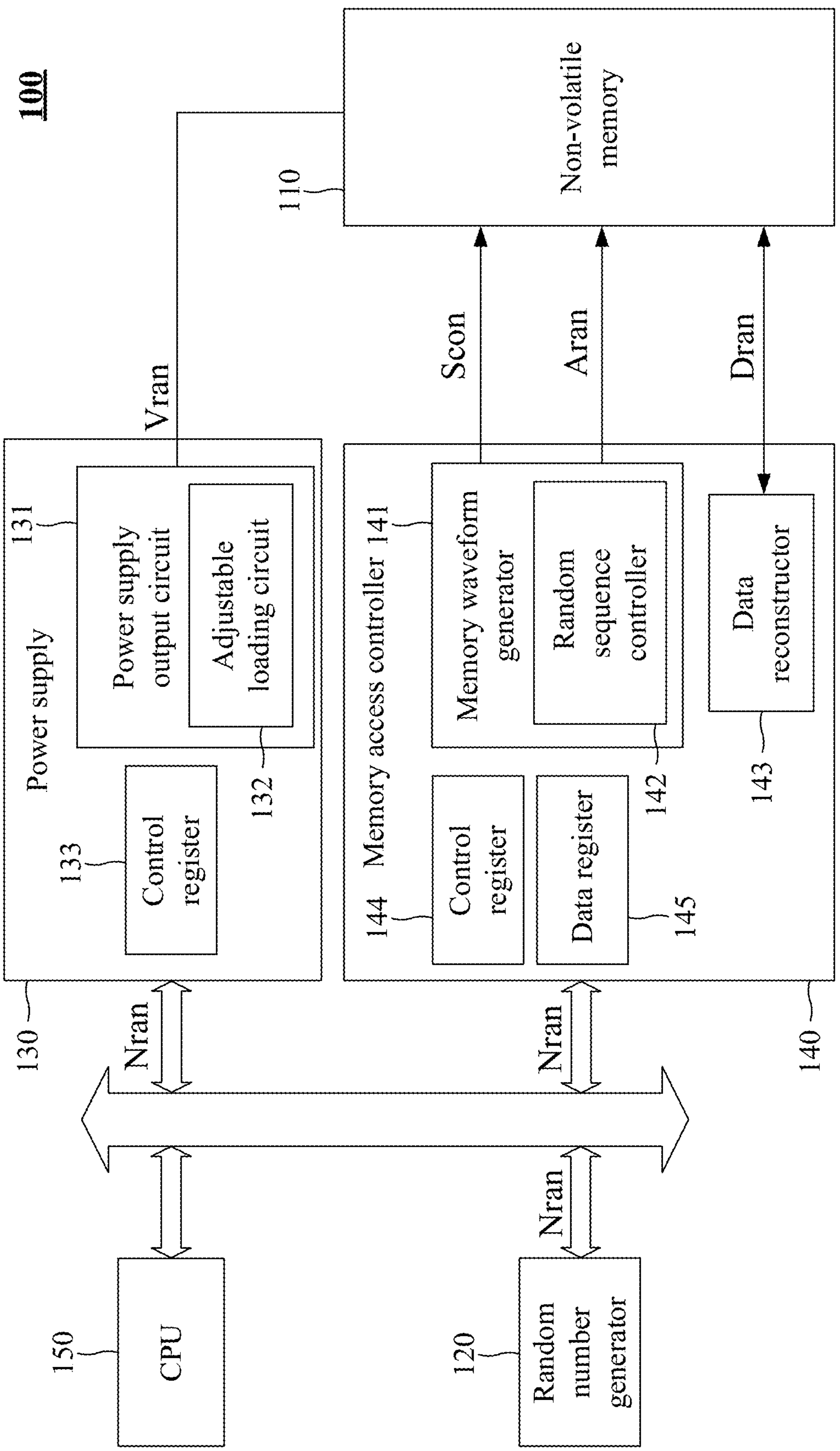
FIG. 1 shows an embodiment of a non-volatile memory device of the present disclosure.
Figure 2:
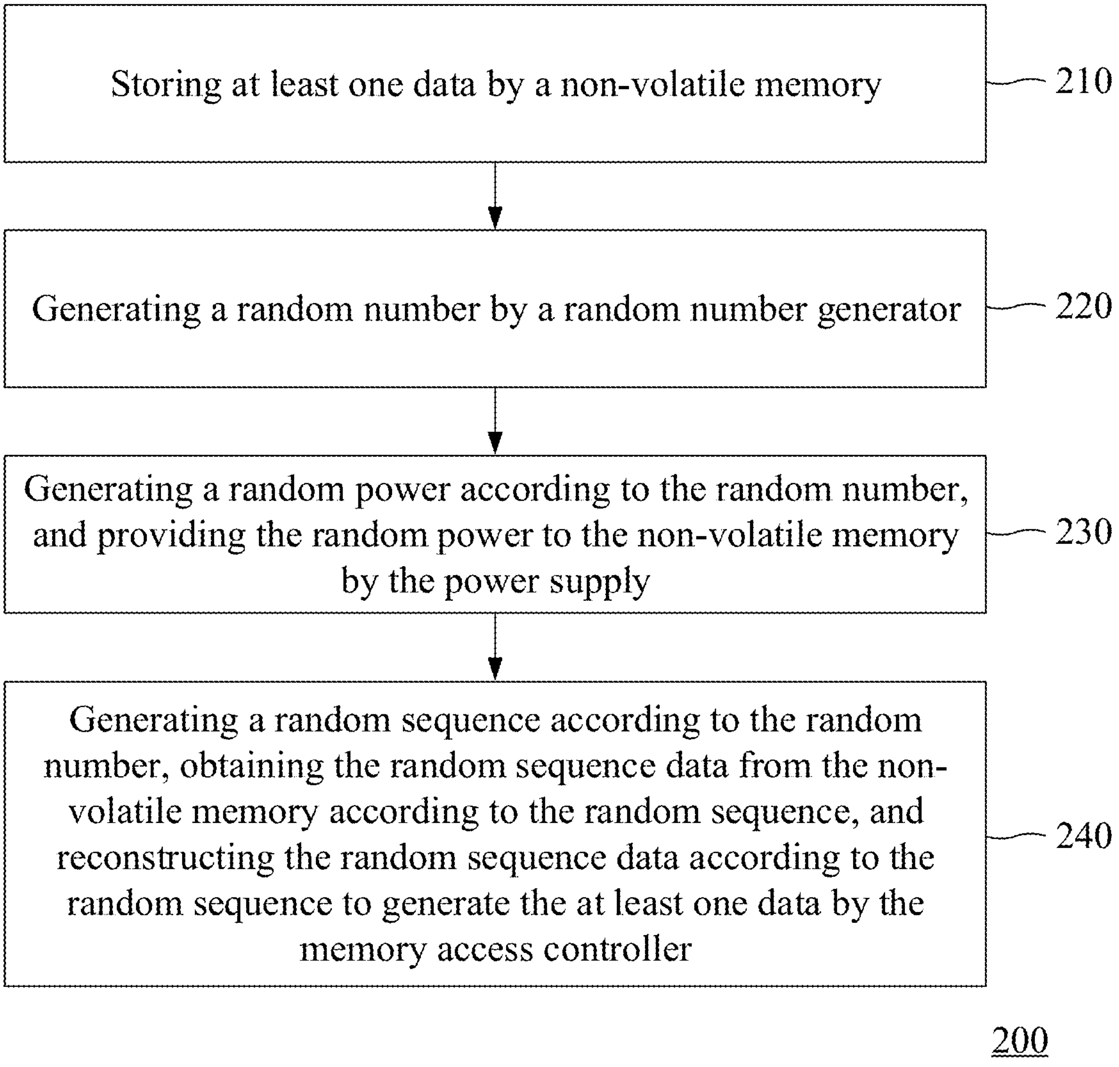
FIG. 2 shows an embodiment of a flow diagram of a control method of a non-volatile memory device of the present disclosure.

FIG. 1 shows an embodiment of a non-volatile memory device 100 of the present disclosure. As shown in the figure, the non-volatile memory device 100 includes a non-volatile memory (NVM) 110, a random number generator 120, a power supply 130, and a memory access controller 140. For facilitating the understanding of operations of the non-volatile memory device 100, reference is made to FIG. 2. FIG. 2 shows an embodiment of a flow diagram of a control method 200 of the non-volatile memory device 100 of the present disclosure.

In step 210, storing at least one data by the non-volatile memory 110. For example, the non-volatile memory 110 can be utilized to store one or multiple data. In step 220, generating a random number Nran by the random number generator 120. For example, the random number generator 120 can be a true random number generator (TRNG). However, the above-mentioned embodiment is merely utilized to describe one of the implementations, and the present disclosure is not limited thereto. In another embodiment, the random number generator 120 of the present disclosure can be implemented by other suitable component based on actual requirements.

In step 230, generating a random power Vran according to the random number Nran, and providing the random power Vran to the non-volatile memory 110 by the power supply 130. For example, conventional power supply 130 will provide 10V (volt) power and 10 mA (amp) to the non-volatile memory 110. The power supply 130 of the present disclosure can provide the random power Vran according to the random number Nran, for example, the power supply output circuit 131 of the power supply 130 can provide 11V with 9.1 mA power to the non-volatile memory 110 and an additional current consumption (for example: 5 mA) controlled by an adjustable loading circuit 132. However, the above-mentioned embodiment is merely utilized to describe one of the implementations, and the present disclosure is not limited thereto. In another embodiment, the power supply 130 of the present disclosure can provide other suitable power (e.g., voltage or current) to the non-volatile memory 110 based on actual requirements.

In step 240, generating a random sequence Aran according to the random number Nran, obtaining a random sequence data Dran from the non-volatile memory 110 according to the random sequence Aran, and reconstructing the random sequence data Dran according to the random sequence Aran to generate the at least one data by the memory access controller 140.

For example, a random sequence controller 142 of a memory waveform generator 141 of the memory access controller 140 is configured to generate the random sequence Aran according to the random number Nran, transmit the random sequence Aran to the non-volatile memory 110 to read the at least one data, and read back the random sequence data Dran through the non-volatile memory 110. Besides, a data reconstructor 143 of the memory access controller 140 is configured to reconstruct the random sequence data Dran according to the random sequence Aran to generate the at least one data. As a result, the non-volatile memory device 100 of the present disclosure can access data according to the random number Nran, thereby preventing the data stored in the non-volatile memory 110 from being stolen by lawbreakers.

In some embodiments, the non-volatile memory device 100 of the present disclosure can be applied in System in Package (Sip) or Multi-Chip Module (MCM). However, the above-mentioned embodiment is merely utilized to describe one of the implementations, and the present disclosure is not limited thereto. In another embodiment, the non-volatile memory device 100 can be applied in other suitable component based on actual requirements.

Figure 3:
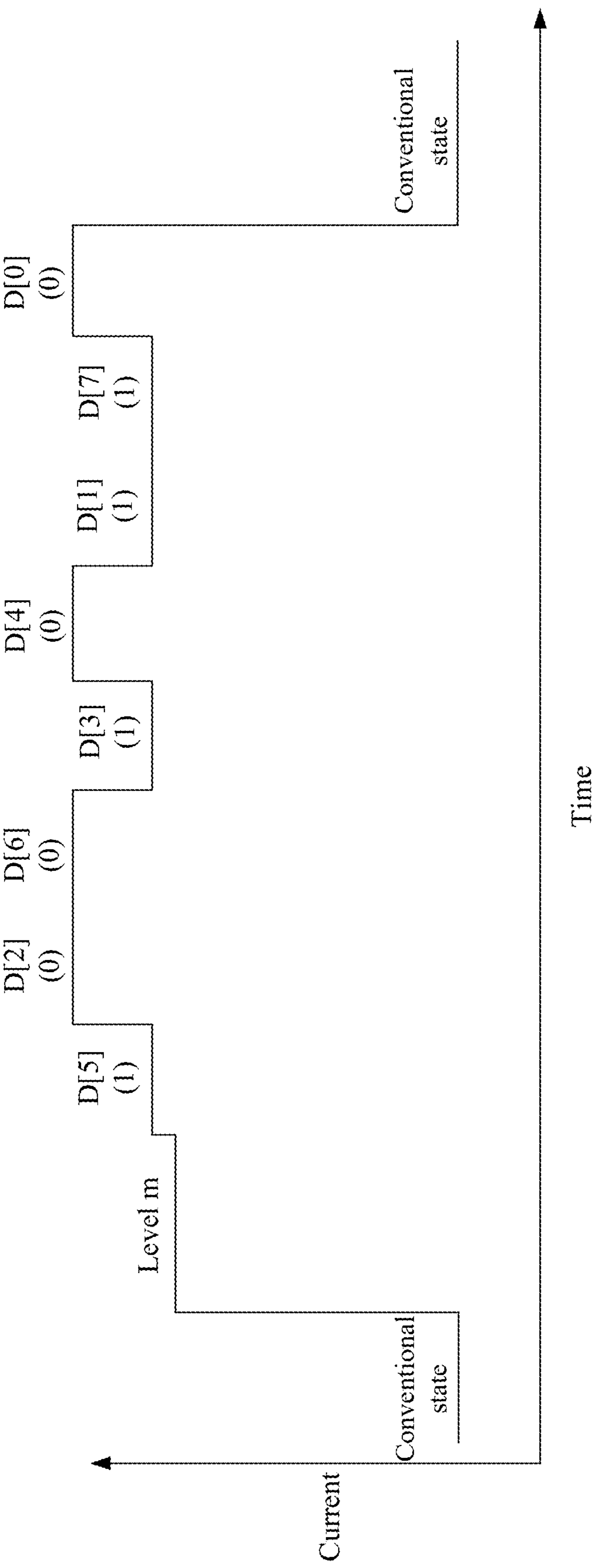
FIG. 3 shows an embodiment of an access signal of the present disclosure.

FIG. 3 shows an embodiment of an access signal of the present disclosure. First of all, if conventional controller wants to access data 0×AA, conventional controller will sequentially access data D[0], D[1], D[2], D[3], D[4], D[5], D[6], D[7]. Assume that D[0], D[2], D[4], D[6] are accessed with high level and result in high power consumption, and D[1], D[3], D[5], D[7] are accessed with low level and result in low power consumption, the above-mentioned power consumption may be utilized by lawbreakers to crack and obtain the data stored in the non-volatile memory. Referring to FIG. 3, the random sequence controller 142 of the present disclosure is configured to generate the random sequence Aran according to the random number Nran. In some embodiments, the random sequence Aran can be a random address sequence. The random sequence controller 142 transmits the random address sequence Aran to the non-volatile memory 110 to read at least one data. It can be noted from FIG. 3 that the sequence in which the present disclosure accesses data is D[5], D[2], D[6], D[3], D[4], D[1], D[7], D[0]. The present disclosure first raises to a random level (level m) before performing the low level and the high level conversion to access the data. In view of the above, the non-volatile memory device 100 of the present disclosure can perform a data accessing process according to the random number Nran, thereby preventing the data stored in the non-volatile memory 110 from being stolen by lawbreakers.

Figure 4:
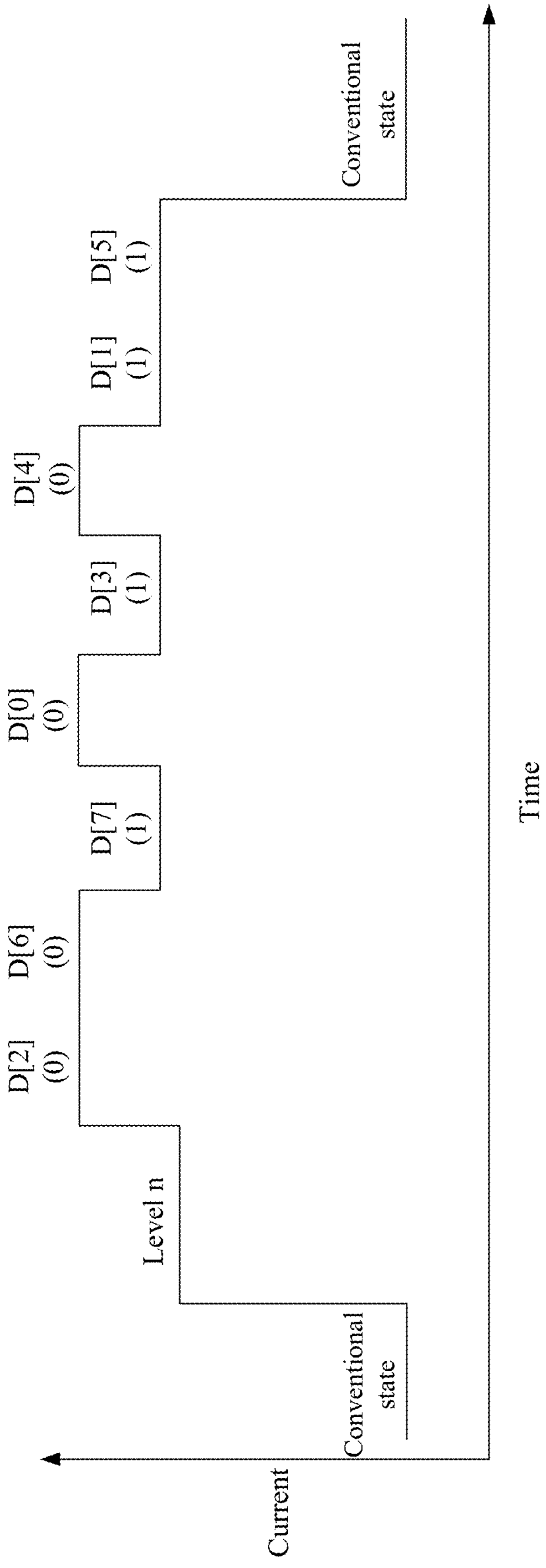
FIG. 4 shows an embodiment of an access signal of the present disclosure.

FIG. 4 shows an embodiment of an access signal of the present disclosure. Referring to FIG. 4, the random sequence controller 142 of the present disclosure is configured to generate the random address sequence Aran according to the random number Nran, and transmit the random address sequence Aran to the non-volatile memory 110 to read the at least one data. It can be noted from FIG. 4 that the sequence in which the present disclosure accesses data is D[2], D[6], D[7], D[0], D[3], D[4], D[1], D[5]. The present disclosure first raises to a random level (level n) before performing the low level and the high level conversion to access the data. In view of the above, the non-volatile memory device 100 of the present disclosure can perform a data accessing process according to the random number Nran, thereby preventing the data stored in the non-volatile memory 110 from being stolen by lawbreakers.

Figure 5:
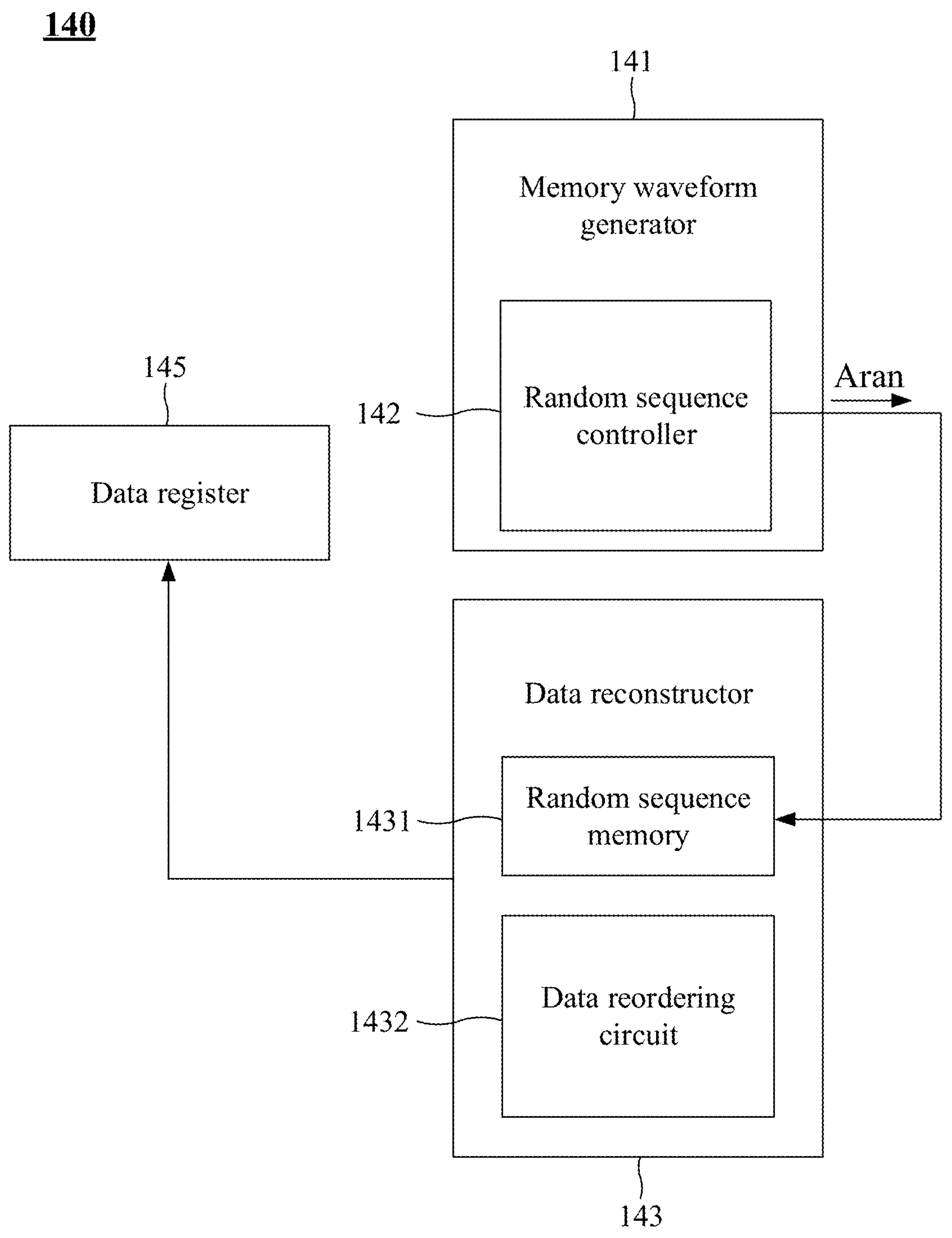
FIG. 5 shows an embodiment of a memory access controller of a non-volatile memory device of the present disclosure.

FIG. 5 shows an embodiment of a memory access controller 140 of a non-volatile memory device 100 of the present disclosure. As shown in the figure, the data reconstructor 143 includes a random sequence memory 1431 and a data reordering circuit 1432.

In some embodiments, the random sequence controller 142 is configured to generate the random sequence Aran according to the random number Nran, and simultaneously transmit the random sequence Aran to the non-volatile memory 110 and the random sequence memory 1431. In some embodiments, the random sequence memory 1431 is configured to store the random sequence. In some embodiments, the data reordering circuit 1432 is configured to reconstruct the random sequence data Dran according to the random sequence Aran stored in the random sequence memory 1431 to generate at least one data.

In some embodiments, the memory access controller 140 includes a data register 145. The data register 145 is configured to temporarily store the at least one data generated by the data reordering circuit 1432 of the memory access controller 140.

Figure 6:
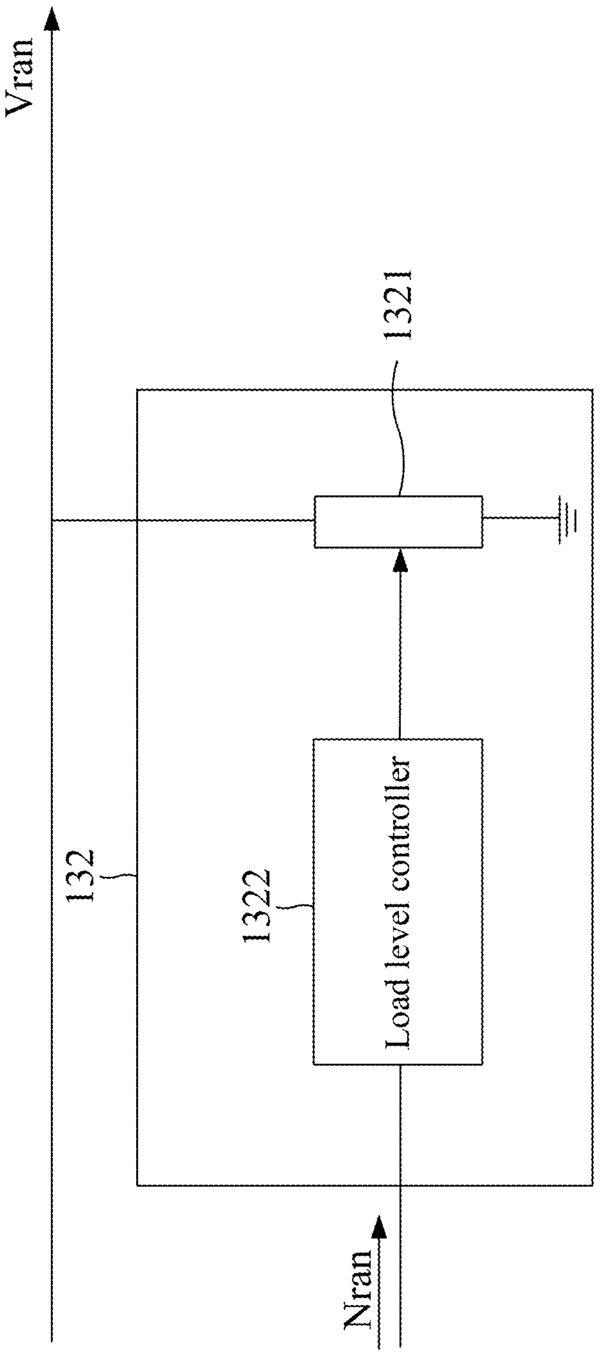
FIG. 6 shows an embodiment of a power supply of a non-volatile memory device of the present disclosure.

FIG. 6 shows an embodiment of a power supply 130 of a non-volatile memory device 100 of the present disclosure. As shown in the figure, the power supply 130 includes an adjustable loading circuit 132. The adjustable loading circuit 132 is configured to generate the random power Vran according to the random number Nran.

In some embodiments, the adjustable loading circuit 132 includes an adjustable load 1321 and a load level controller 1322. The load level controller 1322 is configured to control the adjustable load 1321 according to the random number Nran to output the random power Vran. In some embodiments, the adjustable load 1321 can be a variable resistor. However, the above-mentioned embodiment is merely utilized to describe one of the implementations, and the present disclosure is not limited thereto. In another embodiment, the adjustable load 1321 can be implemented by other suitable component based on actual requirements.

It is noted that the present disclosure is not limited to the embodiments as shown in FIG. 1 to FIG. 6, it is merely an example for illustrating one of the implements of the present disclosure, and the scope of the present disclosure shall be defined on the bases of the claims as shown below. In view of the foregoing, it is intended that the present disclosure covers modifications and variations to the embodiments of the present disclosure, and modifications and variations to the embodiments of the present disclosure also fall within the scope of the following claims and their equivalents.

As described above, technical features of some embodiments of the present disclosure make an improvement to the prior art. The non-volatile memory device and the control method thereof in the present disclosure can perform a data accessing process according to a random number, thereby preventing the data stored in the non-volatile memory from being stolen by lawbreakers.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A non-volatile memory device, comprising:
   - a non-volatile memory, configured to store at least one data;
   - a random number generator, configured to generate a random number;
   - a power supply, configured to generate a random power according to the random number, and provide the random power to the non-volatile memory; and
   - a memory access controller, configured to generate a random sequence according to the random number, obtaining a random sequence data from the non-volatile memory according to the random sequence, and reconstruct the random sequence data according to the random sequence to generate the at least one data.

2. The non-volatile memory device of claim 1, wherein the memory access controller comprises:
   - a random sequence controller, configured to generate the random sequence according to the random number, transmit the random sequence to the non-volatile memory to read the at least one data, and read back the random sequence data through the non-volatile memory.

3. The non-volatile memory device of claim 2, wherein the memory access controller further comprises:
   - a data reconstructor, configured to reconstruct the random sequence data according to the random sequence to generate the at least one data.

4. The non-volatile memory device of claim 3, wherein the data reconstructor comprises:
   - a random sequence memory, configured to store the random sequence.

5. The non-volatile memory device of claim 4, wherein the random sequence controller is configured to generate the random sequence according to the random number, and simultaneously transmit the random sequence to the non-volatile memory and the random sequence memory.

6. The non-volatile memory device of claim 5, wherein the data reconstructor further comprises:
   - a data reordering circuit, configured to reconstruct the random sequence data according to the random sequence stored in the random sequence memory to generate the at least one data.

7. The non-volatile memory device of claim 1, wherein the memory access controller comprises:
   - a data register, configured to temporarily store the at least one data generated by the memory access controller.

8. The non-volatile memory device of claim 1, wherein the random number generator comprises a true random number generator.

9. The non-volatile memory device of claim 1, wherein the power supply comprises:
   - an adjustable loading circuit, configured to generate the random power according to the random number.

10. The non-volatile memory device of claim 9, wherein the adjustable loading circuit comprises:
    - an adjustable load; and
    - a load level controller, configured to control the adjustable load according to the random number to output the random power.

11. A control method of a non-volatile memory device, comprising:
    - storing at least one data by a non-volatile memory;
    - generating a random number by a random number generator;
    - generating a random power according to the random number, and providing the random power to the non-volatile memory by a power supply; and
    - generating a random sequence according to the random number, obtaining a random sequence data from the non-volatile memory according to the random sequence, and reconstructing the random sequence data according to the random sequence to generate the at least one data by a memory access controller.

12. The control method of claim 11, wherein generating the random sequence according to the random number, obtaining the random sequence data from the non-volatile memory according to the random sequence, and reconstructing the random sequence data according to the random sequence to generate the at least one data by the memory access controller comprises:
    - generating the random sequence according to the random number, transmitting the random sequence to the non-volatile memory to read the at least one data, and reading back the random sequence data through the non-volatile memory by a random sequence controller of the memory access controller.

13. The control method of claim 12, wherein generating the random sequence according to the random number, obtaining the random sequence data from the non-volatile memory according to the random sequence, and reconstructing the random sequence data according to the random sequence to generate the at least one data by the memory access controller comprises:
    - reconstructing the random sequence data according to the random sequence to generate the at least one data by a data reconstructor of the memory access controller.

14. The control method of claim 13, further comprising:
    - storing the random sequence by a random sequence memory of the data reconstructor.

15. The control method of claim 14, wherein the random sequence controller is configured to generate the random sequence according to the random number, and simultaneously transmit the random sequence to the non-volatile memory and the random sequence memory.

16. The control method of claim 15, wherein reconstructing the random sequence data according to the random sequence to generate the at least one data by the data reconstructor of the memory access controller comprises:
    - reconstructing the random sequence data according to the random sequence stored in the random sequence memory to generate the at least one data by a data reordering circuit of the data reconstructor.

17. The control method of claim 11, further comprising:
    - temporarily storing the at least one data generated by the memory access controller by a data register of the memory access controller.

18. The control method of claim 11, wherein the random number generator comprises a true random number generator.

19. The control method of claim 11, wherein generating the random power according to the random number, and providing the random power to the non-volatile memory by the power supply comprises:
    - generating the random power according to the random number by an adjustable loading circuit of the power supply.

20. The control method of claim 19, wherein generating the random power according to the random number, and providing the random power to the non-volatile memory by the power supply comprises:

controlling an adjustable load of the adjustable loading circuit according to the random number to output the random power by a load level controller of the adjustable loading circuit.

* * * * *